United States Patent
Iwamura et al.

(10) Patent No.: US 10,682,882 B2
(45) Date of Patent: Jun. 16, 2020

(54) AIRLESS TIRE AND HUB FOR AIRLESS TIRE

(71) Applicants: SUMITOMO RUBBER INDUSTRIES, LTD., Kobe-shi, Hyogo (JP); HONDA MOTOR CO., LTD., Tokyo (JP)

(72) Inventors: Wako Iwamura, Kobe (JP); Makoto Sugiya, Kobe (JP); Nobuo Kambara, Saitama (JP); Mikio Kashiwai, Saitama (JP); Haruo Fukuta, Imizu (JP); Shunsuke Uchiyama, Imizu (JP); Shoushuu Yamazaki, Imizu (JP)

(73) Assignees: SUMITOMO RUBBER INDUSTRIES, LTD., Kobe-Shi, Hyogo (JP); HONDA MOTOR CO., LTD., Tokyo (JP)

( * ) Notice: Subject to any disclaimer, the term of this patent is extended or adjusted under 35 U.S.C. 154(b) by 648 days.

(21) Appl. No.: 15/284,737

(22) Filed: Oct. 4, 2016

(65) Prior Publication Data

US 2017/0113484 A1   Apr. 27, 2017

(30) Foreign Application Priority Data

Oct. 26, 2015   (JP) .................. 2015-209668

(51) Int. Cl.
*B60B 9/26* (2006.01)
*B60B 27/06* (2006.01)
(Continued)

(52) U.S. Cl.
CPC .................. *B60B 9/26* (2013.01); *B60B 1/06* (2013.01); *B60B 9/10* (2013.01); *B60B 27/02* (2013.01); *B60B 27/06* (2013.01); *B60C 7/24* (2013.01); *B60B 5/02* (2013.01); *B60B 2900/311* (2013.01); *B60B 2900/50* (2013.01)

(58) Field of Classification Search
CPC .... B60C 7/12; B60C 7/18; B60C 7/14; B60C 7/102; B60C 7/24; B60B 9/26; B60B 9/10; B60B 27/06; B60B 27/02; B60B 1/06
USPC ....... 152/18, 20, 17, 19, 22, 167; 301/5.303, 301/5.305, 5.306
See application file for complete search history.

(56) References Cited

U.S. PATENT DOCUMENTS 3,130,766 A * 4/1964 Arnot ..................... B60B 9/10
                                                                     152/41
4,030,753 A * 6/1977 Meiners ................ B60B 15/26
                                                                    301/36.1

(Continued)

FOREIGN PATENT DOCUMENTS

| JP | 2014-218132 A | 11/2014 | | |
| WO | WO-2005063505 A1 | * | 7/2005 | ............... B60B 9/02 |
| WO | WO-2016099480 A1 | * | 6/2016 | ............... B60C 7/26 |

*Primary Examiner* — Scott A Browne
(74) *Attorney, Agent, or Firm* — Birch, Stewart, Kolasch & Birch, LLP

(57) ABSTRACT

An airless tire includes a cylindrical tread ring having a ground contact surface, a hub disposed radially inward of the tread ring and a plurality of spokes each connecting the tread ring to the hub. The hub includes a disk portion to be fixed to an axle and a cylindrical portion extending in an axial direction of the tire from a radially outer portion of the disk portion. The cylindrical portion includes a radially inner surface being provided with a circumferentially extending projection protruding radially inwardly.

11 Claims, 5 Drawing Sheets

(51) Int. Cl.
  *B60B 1/06*   (2006.01)
  *B60B 9/10*   (2006.01)
  *B60B 27/02*  (2006.01)
  *B60C 7/24*   (2006.01)
  *B60B 5/02*   (2006.01)

(56) References Cited

U.S. PATENT DOCUMENTS

| | | | | |
|---|---|---|---|---|
| 5,957,541 | A * | 9/1999 | Seigler | A63C 17/26 |
| | | | | 301/5.301 |
| 7,025,427 | B2 * | 4/2006 | Fitzgerald | B60B 1/08 |
| | | | | 301/63.107 |
| 8,091,596 | B2 * | 1/2012 | Louden | B60B 9/02 |
| | | | | 152/5 |
| 2005/0248212 | A1 * | 11/2005 | Tanno | B60B 3/02 |
| | | | | 301/95.108 |
| 2006/0108857 | A1 * | 5/2006 | Simon, Sr. | A63C 17/223 |
| | | | | 301/5.301 |
| 2008/0246330 | A1 * | 10/2008 | Roderick | A63C 17/223 |
| | | | | 301/5.307 |
| 2009/0211681 | A1 * | 8/2009 | Palinkas | B60B 23/00 |
| | | | | 152/323 |
| 2014/0332127 | A1 | 11/2014 | Iwamura | |

\* cited by examiner

AIRLESS TIRE AND HUB FOR AIRLESS TIRE

BACKGROUND ART

Field of the Invention

The present invention relates to airless tires capable of structurally supporting the weight of a vehicle, and more particularly to an airless tire and a hub for an airless tire which may offer excellent steering stability.

Description of the Related Art

Japanese Unexamined Patent Application Publication No. 2014-218132 discloses an airless tire which includes a cylindrical tread ring having a ground contact surface, a hub disposed radially inward of the tread ring and a plurality of spokes each connecting the tread ring to the hub. The hub of the airless tire disclosed in the publication also includes a disk portion to be fixed to an axle and a cylindrical portion extending in an axial direction of the tire from a radially outer portion of the disk portion. The cylindrical portion of the hub is configured to have substantially a constant thickness.

The cylindrical portion of the hub is required to have high rigidity in order to make tread rings of airless tires contact with a road with a proper orientation. From results of various experiments, unfortunately, it has been found that a portion of the cylindrical portion that is farthest from the disk portion tends to elastically deform when receiving lateral force on cornering. This may bring deterioration in ground contact property of tread rings, and therefore steering stability of airless tires may be deteriorated.

SUMMARY OF THE INVENTION

In view of the above problems in the conventional art, the present invention has an object to provide an airless tire and a hub for an airless tire which may offer excellent steering stability by basically modifying a shape of cylindrical portion of the hub.

In one aspect of the invention, an airless tire includes a cylindrical tread ring having a ground contact surface, a hub disposed radially inward of the tread ring and a plurality of spokes each connecting the tread ring to the hub. The hub includes a disk portion to be fixed to an axle and a cylindrical portion extending in an axial direction of the tire from a radially outer portion of the disk portion. The cylindrical portion includes a radially inner surface being provided with a circumferentially extending projection protruding radially inwardly.

In another aspect of the invention, the cylindrical portion may include a radially outer surface that extends at a substantially constant outer diameter from an axially first end to an axially second end of the cylindrical portion.

In another aspect of the invention, the projection may extend continuously in the circumferential direction of the tire to form an annular shape.

In another aspect of the invention, the projection may be provided on an axially one end side of the cylindrical portion.

In another aspect of the invention, the disk portion may be disposed on an axially first end side of the cylindrical portion, and the projection may be provided on an axially second end side of the cylindrical portion.

In another aspect of the invention, the hub may be made of a metallic material.

In another aspect of the invention, in a tire meridian cross-sectional which includes a tire rotation axis, a maximum thickness (Th) of a portion provided with the projection may be in a range of from 1.30 to 5.00 times of a minimum thickness (Tw) of a portion of the cylindrical portion where the projection is not provided.

In another aspect of the invention, the projection may haves an axial width in a range of from 0.02 to 0.30 times of an axial width of the cylindrical portion.

In another aspect of the invention, a hub for airless tires, the hub includes a disk portion to be fixed to an axle and a cylindrical portion extending in an axial direction of the tire from a radially outer portion of the disk portion. The cylindrical portion includes a radially inner surface being provided with a circumferentially extending projection protruding radially inwardly.

DESCRIPTION OF THE PREFERRED EMBODIMENTS

Figure 1:
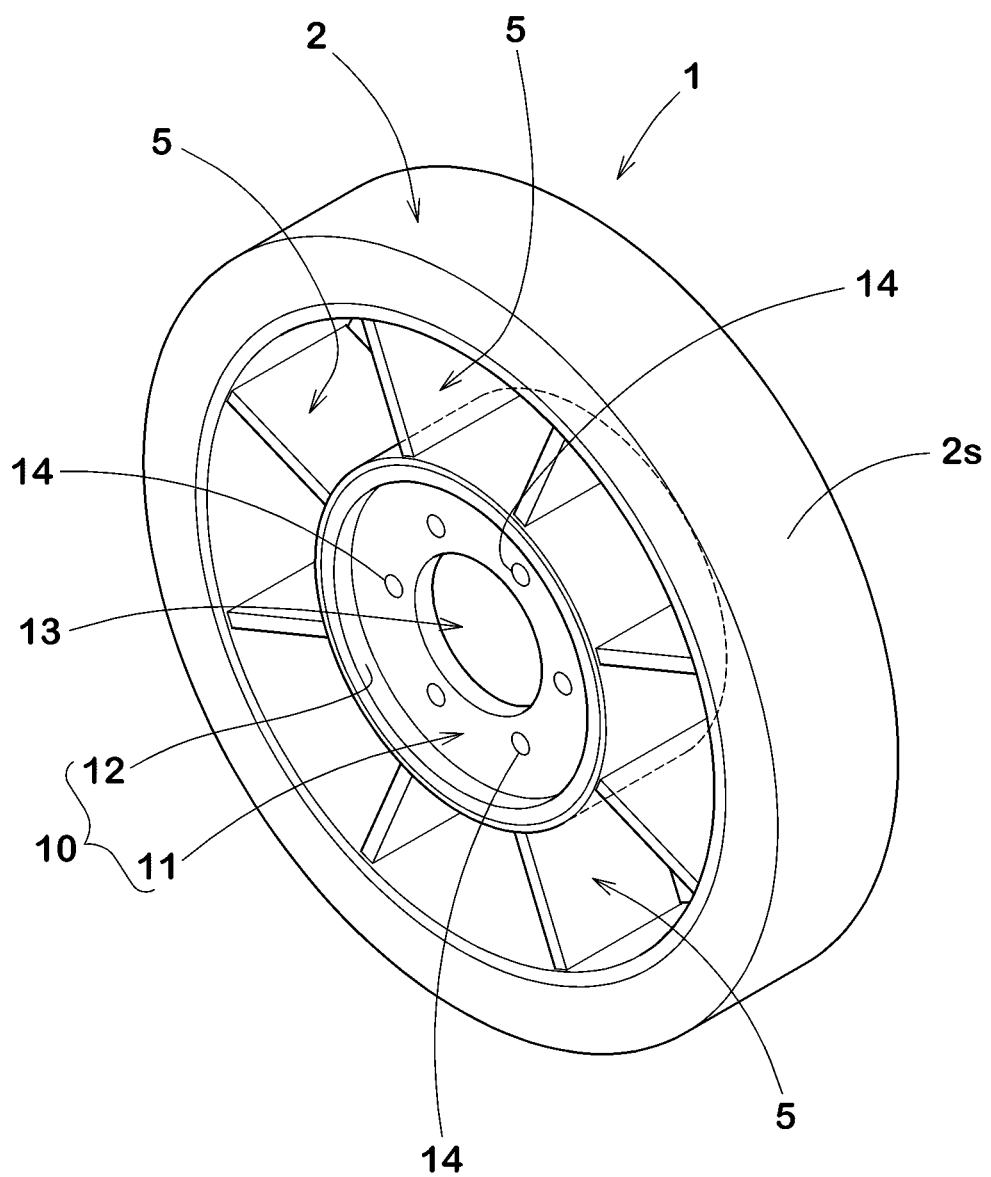
FIG. 1 is a perspective view of an airless tire according to an embodiment of the present invention.

An embodiment of the present invention will be explained below with reference to the accompanying drawings. Note that like reference numerals refer to the like elements throughout.

Figure 2:
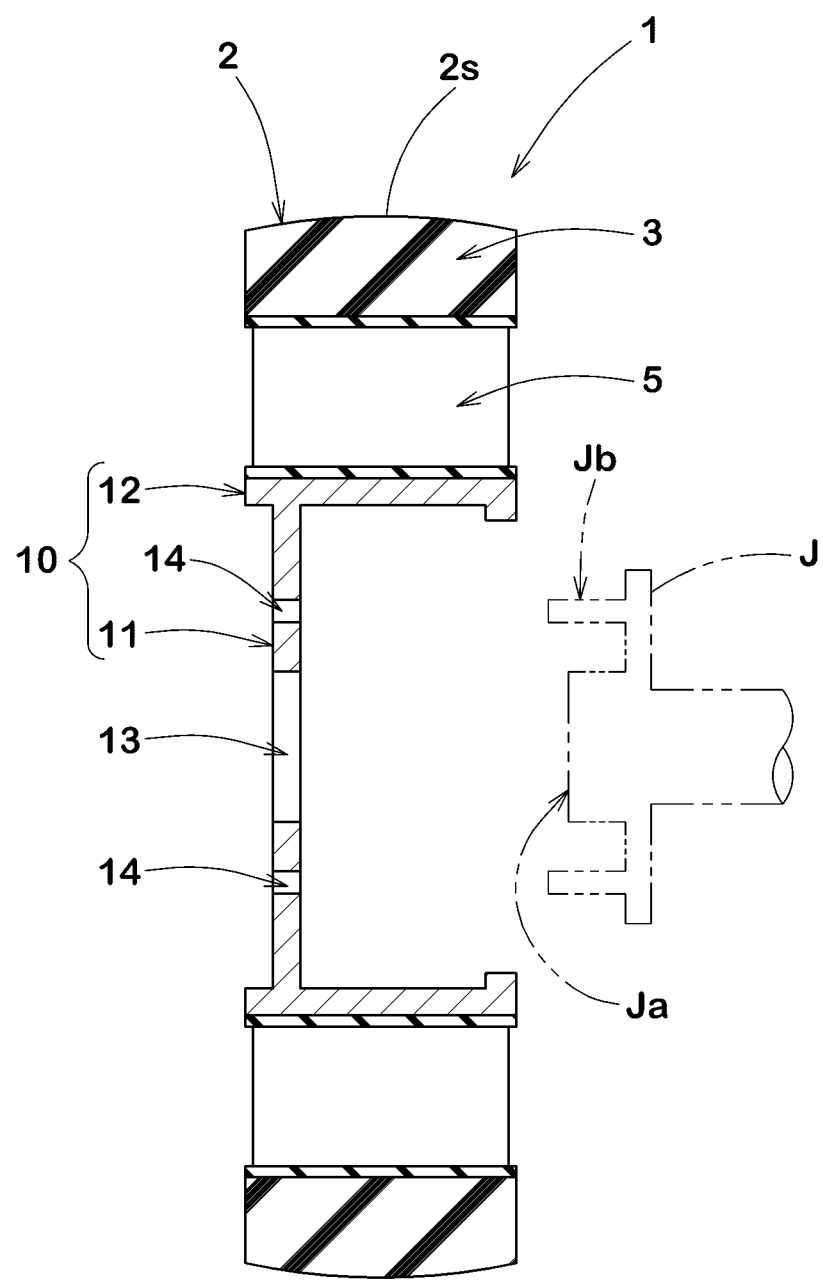
FIG. 2 is a cross-sectional view of the airless tire illustrated in FIG. 1.

FIG. 1 illustrates a perspective view of an airless tire 1 according to an embodiment of the present invention, and FIG. 2 illustrates a cross-sectional view including a tire rotation axis of the airless tire illustrated in FIG. 1. The airless tire 1 according to the present embodiment can carry a load by its structural components without the support of a gas inflation, and preferably may be embodied as for passenger cars.

As illustrated in FIG. 1 and FIG. 2, the airless tire 1 includes a cylindrical tread ring 2, a hub 10 disposed radially inward of the tread ring 2 and a plurality of spokes 5 each connecting the tread ring 2 to the hub 10.

The tread ring 2 is configured to a cylindrical shape with a ground contact surface 2s. The tread ring 2 which may be a portion corresponding to the tread band of a pneumatic tire. The tread ring 2 includes a tread rubber component 3 and at least one reinforcing cord layer (not illustrated), for example. The tread component 3 and the at least one reinforcing cord layer can be embodied in accordance with a conventional manner, for example.

The spokes 5 are disposed between the tread ring 2 and the hub 10 to connect them with each other. As illustrated in FIG. 1, in this embodiment, a plurality of flat plate-shaped spokes 5 with an inclination angle with respect to the tire equatorial plane is arranged in the circumferential direction of the tire. Note that the spokes 5 are not limited to the above embodiment. The spokes 5, for example, are made of elastomeric material, e.g. rubber, thermoplastics resin, thermosetting resin and a composition that includes any one the forgoing, for example. In particular, thermosetting resin typified by urethane resin may preferably be employed for the spokes 5.

As illustrated in FIG. 2, the hub 10 may be a portion corresponding to a wheel rim for pneumatic tires. In this embodiment, the hub 10 includes a disk portion 11 to be fixed to an axle J and a cylindrical portion 12 extending in an axial direction of the tire from a radially outer portion of the disk portion 11. The hub 10, for example, may preferably be made of a metallic material, e.g., steel, aluminum alloy, magnesium alloy, titan and the like, same as a tire wheel rim. Note that the hub 10 is not limited to such an aspect, but can be made of FRP, CFRP and the like.

The disk portion 11, for example, is disposed on an axially first end side (left side in FIG. 2) of the cylindrical portion 12. On the center of the disk portion 11, a hub hole 13 into which one end (Ja) of the axle (J) is inserted is provided. A plurality of bolt insertion holes 14 for coupling with the hub bolts (Jb) of the axle (J) with nuts is provided around the hub hole 13.

Figure 3:
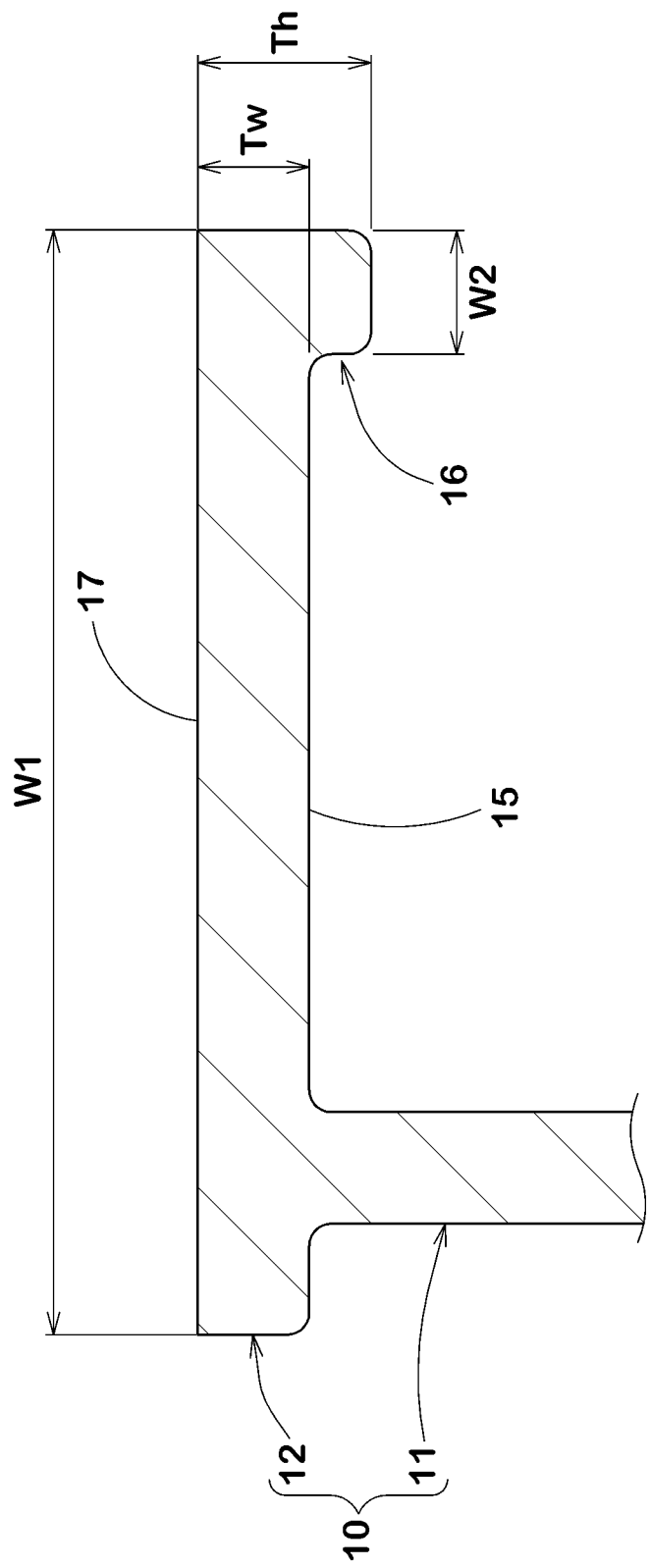
FIG. 3 is a partial enlarged view of the cylindrical portion illustrated in FIG. 2.

FIG. 3 illustrates a partial enlarged view of the cylindrical portion 12 illustrated in FIG. 2. As illustrated in FIG. 3, the cylindrical portion 12 is provided with a circumferentially extending projection 16 protruding radially inwardly on its radially inner surface 15. The projection 16 may increase the rigidity of the hub 10 effectively, particularly the bending rigidity of the cylindrical portion 12, while suppressing increase of the tire weight. Thus, the airless tire 1 according to the invention may offer excellent steering stability without deteriorating fuel consumption of vehicles.

In a preferred embodiment, the projection 16 may extend continuously in the circumferential direction of the tire to form an entire annular shape. Such a projection 16 may further increase the rigidity of the hub 10.

Preferably, the projection 16 may be provided on at least an axially one end side of the cylindrical portion 12. In this embodiment, the disk portion 11 is disposed on the first end side (left in FIG. 3) of the cylindrical portion 12, while the projection 16 is provided on an opposite side, i.e., an axially second end side (right in FIG. 3) of the cylindrical portion 12. In a more preferred embodiment, the axially outer side surface of the projection 16 is configured to form a part of an axially outer side end of the cylindrical portion 12 such that a flat end surface of the cylindrical portion 12 is provided. Such a projection 16 may enhance the rigidity of a portion of the cylindrical portion 12 far from the disk portion 11, and thus further improves steering stability of the tire.

In a tire meridian cross-sectional which includes a tire rotation axis, the maximum thickness (Th) of a portion provided with the projection 16 is in a range of not less than 1.30 times of the minimum thickness (Tw) of a portion of the cylindrical portion 12 where the projection 16 is not provided, more preferably not less than 2.50 times, but preferably not more than 5.00 times, more preferably not more than 3.80 times. When the maximum thickness Th is less than 1.30 times of the minimum thickness Tw, it may be difficult to increase in rigidity of the hub 10, and therefore improvement effect to steering stability may be lower. On the other hand, when the maximum thickness Th is more than 5.00 times of the minimum thickness Tw, the tire weight increases and the fuel consumption may be deteriorated. These will be disclosed in the later examples.

The axial width W2 of the projection 16 is preferably in a range of not less than 0.02 times of the axial width W1 of the cylindrical portion 12, more preferably not less than 0.05 times, but preferably not more than 0.30 times, more preferably not more than 0.15 times. When the width W2 of the projection 16 is less than 0.02 times of the width W1 of the cylindrical portion 12, it may be difficult to increase in rigidity of the hub 10, and therefore improvement effect to steering stability may be lower. When the width W2 of the projection 16 is more than 0.30 times of the width W1 of the cylindrical portion 12, the tire weight may increase. These will be disclosed in the later examples.

Preferably, the cylindrical portion 12 comprises a radially outer surface 17 that extends at a substantially constant outer diameter from the axially first end to the axially second end of the cylindrical portion 12 to form a flat outer surface. This structure can offer better adhesive property to the spokes 5 (illustrated in FIG. 2), and can easy to be increased in rigidity sufficiently by the projection.

Figure 4:
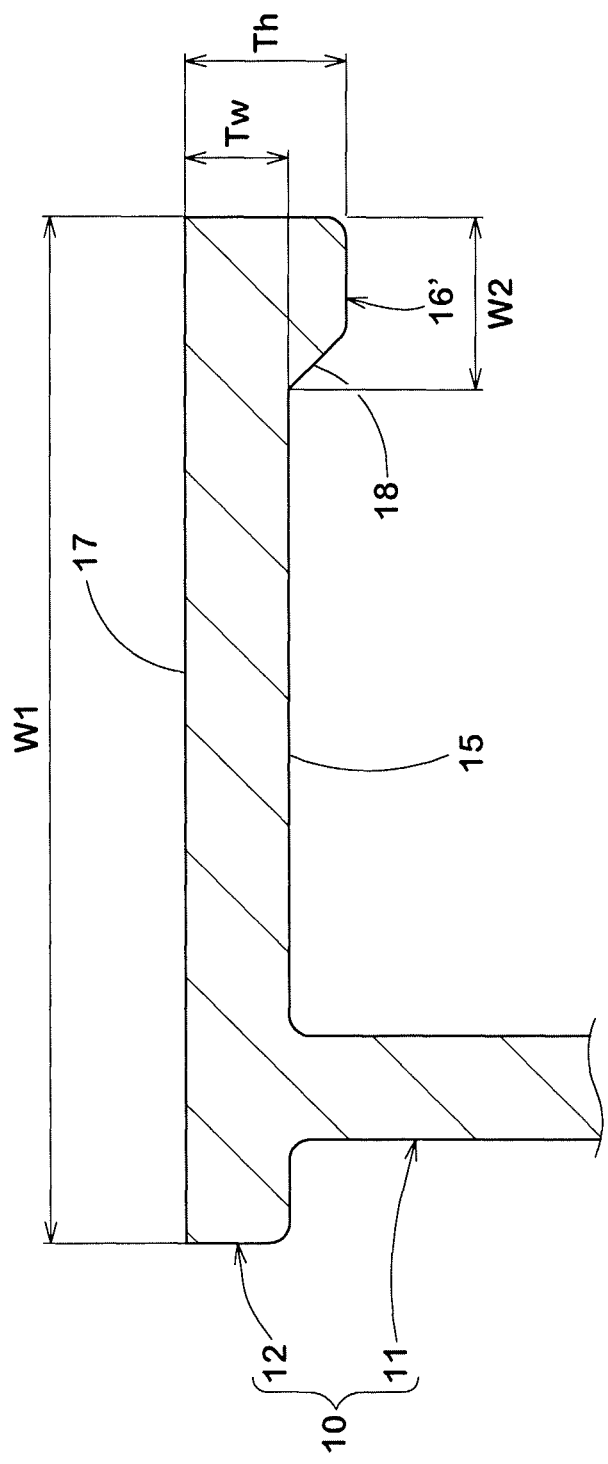
FIG. 4 is a partial enlarged view of a cylindrical portion according to another embodiment of an airless tire of the present invention.

FIG. 4 illustrates a partial enlarged view of the cylindrical portion 12 of the hub 10 according to another embodiment of the present invention. In the embodiment illustrated in FIG. 4, the projection 16', for example, includes an increase portion 18 in which the thickness thereof increases gradually toward the axially outward of the tire. This structure may reduce a portion that changes in rigidity suddenly and therefore stress concentration thereto can be suppressed. Note that the width W2 of the projection 16' is a width that includes the increase portion 18.

Figure 5:
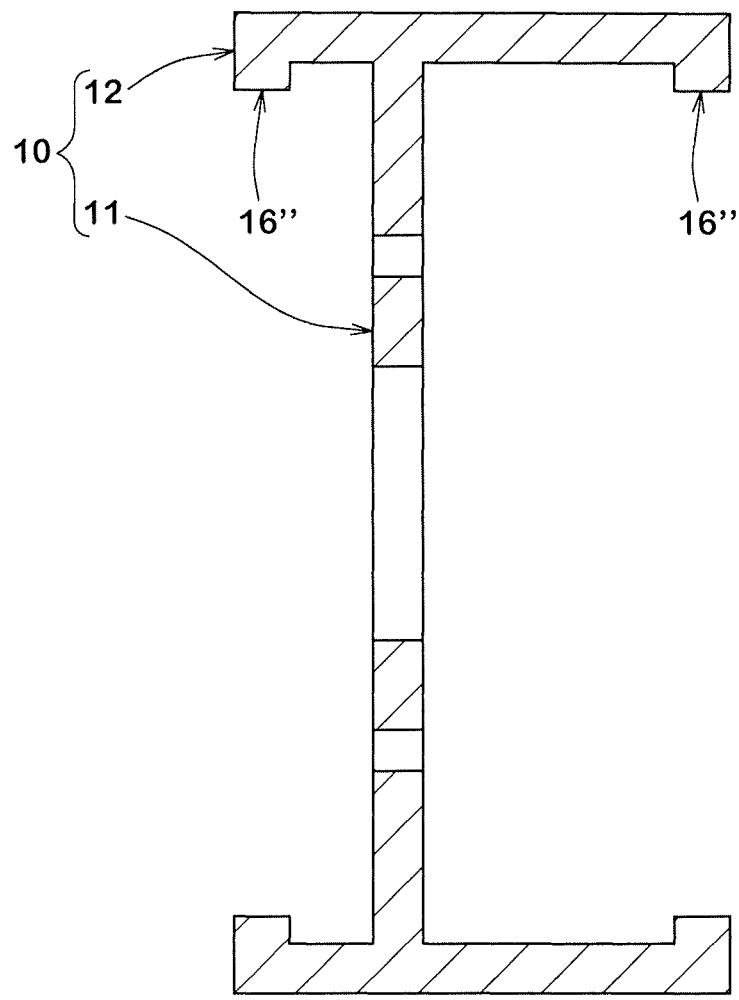
FIG. 5 is a cross-sectional view of a hub according to another embodiment of an airless tire of the present invention.

FIG. 5 illustrates a cross-sectional view of the hub 10 according to another embodiment of the present invention. As illustrated in FIG. 5, a plurality of projections 16" can be provided. In this embodiment, the projections 16" include end side projections each of which is provided on a respective one of the axially first and second ends, for example. This structure may effectively enhance in rigidity of the cylindrical portion 12 as a whole and therefore excellent steering stability can be offered.

Note that each type of the hubs 10 described above is not particularly limited to be used for passenger cars, but can be used for solid tires having a solid rubber structure for industrial vehicles, for example.

While the particularly preferable embodiments in accordance with the present invention have been described in detail, the present invention is not limited to the illustrated embodiments, but can be modified and carried out in various aspects.

EXAMPLE

Airless tires of 125/80R13 having hubs illustrated in FIG. 2 or FIG. 5 were manufactured based on the details shown in Table 1, and then performance of each tire was tested. As comparative examples (Refs. 1 to 4), airless tires having hubs without having a projection were also manufactured, and then performance of each tire was also tested. Test methods are as follows:

Tire Weight Measuring:

A single tire weight was measured. The results are indicated in Table 1 using an index based on Ref. 1 being 100. The smaller the value, the lighter the weight is.

Steering Stability Test:

Each test tire was mounted on a FF vehicle having a displacement of 1,600 cc as the all wheels, and then a driver drove the vehicle on an oval test course with an asphalt road to evaluate steering stability by his sense. The test results are indicated in Table 1 with a score based on Ref. 1 being 100. The larger the value, the better the steering stability is.

Test results are shown in Table 1. From the test results, it is confirmed that the example tires improve steering stability while minimizing increase of the tire weight.

TABLE 1

|  | Ref. 1 | Ref. 2 | Ref. 3 | Ref. 4 | Ex. 1 | Ex. 2 | Ex. 3 |
|---|---|---|---|---|---|---|---|
| Hub structure | — | — | — | — | FIG. 2 | FIG. 2 | FIG. 2 |
| Hub material | steel | steel | aluminum | Aluminum | steel | Aluminum | Aluminum |
| Minimum thickness Tw of cylindrical portion (mm) | 2.5 | 5.0 | 3.0 | 6.0 | 2.5 | 3.0 | 3.0 |
| Thickness ratio Th/Tw of cylindrical portion | — | — | — | — | 2.00 | 2.00 | 5.00 |
| Width ratio W2/W1 | — | — | — | — | 0.10 | 0.10 | 0.10 |
| Tire weight (index) | 100 | 120 | 80 | 100 | 104 | 82 | 90 |
| Steering stability (score) | 100 | 108 | 98 | 100 | 110 | 108 | 115 |

|  | Ex. 4 | Ex. 5 | Ex. 6 | Ex. 7 | Ex. 8 | Ex. 9 | Ex. 10 | Ex. 11 |
|---|---|---|---|---|---|---|---|---|
| Hub structure | FIG. 2 | FIG. 2 | FIG. 2 | FIG. 2 | FIG. 2 | FIG. 2 | FIG. 2 | FIG. 5 |
| Hub material | aluminum | aluminum | aluminum | aluminum | aluminum | aluminum | aluminum | Aluminum |
| Minimum thickness Tw of cylindrical portion (mm) | 3.0 | 3.0 | 3.0 | 3.0 | 3.0 | 3.0 | 3.0 | 3.0 |
| Thickness ratio Th/Tw of cylindrical portion | 6.00 | 1.30 | 1.20 | 2.00 | 2.00 | 2.00 | 2.00 | 2.00 |
| Width ratio W2/W1 | 0.10 | 0.10 | 0.10 | 0.30 | 0.40 | 0.02 | 0.01 | 0.10 |
| Tire weight (index) | 92 | 84 | 82 | 86 | 88 | 80 | 80 | 85 |
| Steering stability (score) | 116 | 106 | 104 | 115 | 116 | 106 | 103 | 115 |

What is claimed is:

1. An automobile airless tire comprising:
a cylindrical tread ring having a ground contact surface;
a hub disposed radially inward of the tread ring, the hub comprising a disk portion to be fixed to an axle and a cylindrical portion extending in an axial direction of the tire from a radially outer portion of the disk portion in a cantilever manner when the disk portion is fixed to the axle; and
a plurality of spokes each connecting the tread ring to the hub,
wherein
the cylindrical portion comprises a radially outer surface that extends at a substantially constant outer diameter from an axially first end to an axially second end of the cylindrical portion,
the cylindrical portion comprises a radially inner surface being provided with a circumferentially extending projection protruding radially inwardly,
the cylindrical portion axial width from the first end to the second end is equal to the tread ring axial width, and
in a tire meridian cross-section which includes a tire rotation axis, a maximum thickness (Th) of a portion of the cylindrical portion provided with the projection is in a range of from 1.30 to 5.00 times of a minimum thickness (Tw) of a portion of the cylindrical portion not provided with the projection.

2. The automobile airless tire according to claim 1, wherein the projection extends continuously in the circumferential direction of the tire to form an annular shape.

3. The automobile airless tire according to claim 1, wherein the projection is provided on one axially end side of the cylindrical portion.

4. The automobile airless tire according to claim 1, wherein the disk portion is disposed on the axially first end side of the cylindrical portion, and the projection is provided on the axially second end side of the cylindrical portion.

5. The automobile airless tire according to claim 1, wherein the hub is made of a metallic material.

6. The automobile airless tire according to claim 1, wherein the projection has an axial width in a range of from 0.02 to 0.30 times of an axial width of the cylindrical portion.

7. The automobile airless tire according to claim 1, wherein
the disk portion is disposed on the axially first end side of the cylindrical portion,
the projection is provided on the axially second end side of the cylindrical portion, and
an axially outer side surface of the projection is continuous to an axially outer side surface of the cylindrical portion so as to form a continuous flat end surface on the axially second end side of the cylindrical portion.

8. The automobile airless tire according to claim 1, wherein the projection has an axial width in a range of from 0.05 to 0.15 times of an axial width of the cylindrical portion.

9. The automobile airless tire according to claim 1, wherein
the disk portion is disposed on the axially first end side of the cylindrical portion,
the projection is provided on the axially second end side of the cylindrical portion, and
the projection comprises an enlarged thickness portion in which a thickness of the projection increases gradually toward the axially second end of the cylindrical portion.

10. The automobile airless tire according to claim 1, wherein the cylindrical tread ring comprises a tread rubber component which is formed from rubber and includes a tread.

11. The automobile airless tire according to claim 2, wherein the cylindrical tread ring comprises a tread rubber component which is formed from rubber and includes a tread.

* * * * *